United States Patent [19]

Bouyer et al.

[11] 4,079,863

[45] Mar. 21, 1978

[54] APPARATUS FOR DISPENSING MATERIAL IN BULK

[76] Inventors: Claude Bouyer, Bourg St. Sauveur, Bressuire, France, 79300; Louis Feigenbaum, 10 Rue de Laborde, Paris, France

[21] Appl. No.: 697,689

[22] Filed: Jun. 18, 1976

[30] Foreign Application Priority Data

Jun. 20, 1975 France .............................. 75 19335

[51] Int. Cl.² ............................................ G01F 11/20
[52] U.S. Cl. .................................... 222/238; 222/413
[58] Field of Search ............... 222/238, 413, 227, 236, 222/280; 259/6, 21, 40, 41; 198/663, 669

[56] References Cited

U.S. PATENT DOCUMENTS

| 2,743,850 | 5/1956 | Hamilton | 222/238 |
| 3,043,480 | 7/1962 | Wittrock | 222/238 X |
| 3,198,398 | 8/1965 | Schreiber | 222/238 X |
| 3,610,482 | 10/1971 | Steenburgh | 222/413 |
| 3,645,505 | 2/1972 | McLeod et al. | 222/413 X |
| 3,799,405 | 3/1974 | Wallace | 222/238 |

Primary Examiner—Allen N. Knowles
Assistant Examiner—Fred A. Silverberg
Attorney, Agent, or Firm—Browdy and Neimark

[57] ABSTRACT

An apparatus for mixing and dispensing solid materials stored in bulk, which have poor flow characteristics, includes a container or hopper having two, opposite walls which are inclined, for example at angles in the range of from about 20 to about 70 degrees to the horizontal. The hopper has two walls which are vertical. The hopper is provided on its inside with at least two rotary screw conveyors with opposite directional material moving effects. For example, at least one extraction screw conveyor and at least one auxiliary screw conveyor is provided so as to simultaneously generate an upward and a downward movement in the mass of solid, bulk material in the hopper during the extraction operation. The apparatus is particularly useful in extracting, mixing and dispensing powdered, fibrous, aggregate, granular materials, miscellaneous pieces of bulk material scrap and the like without formation of gaps or bridges of material within the hopper.

11 Claims, 8 Drawing Figures

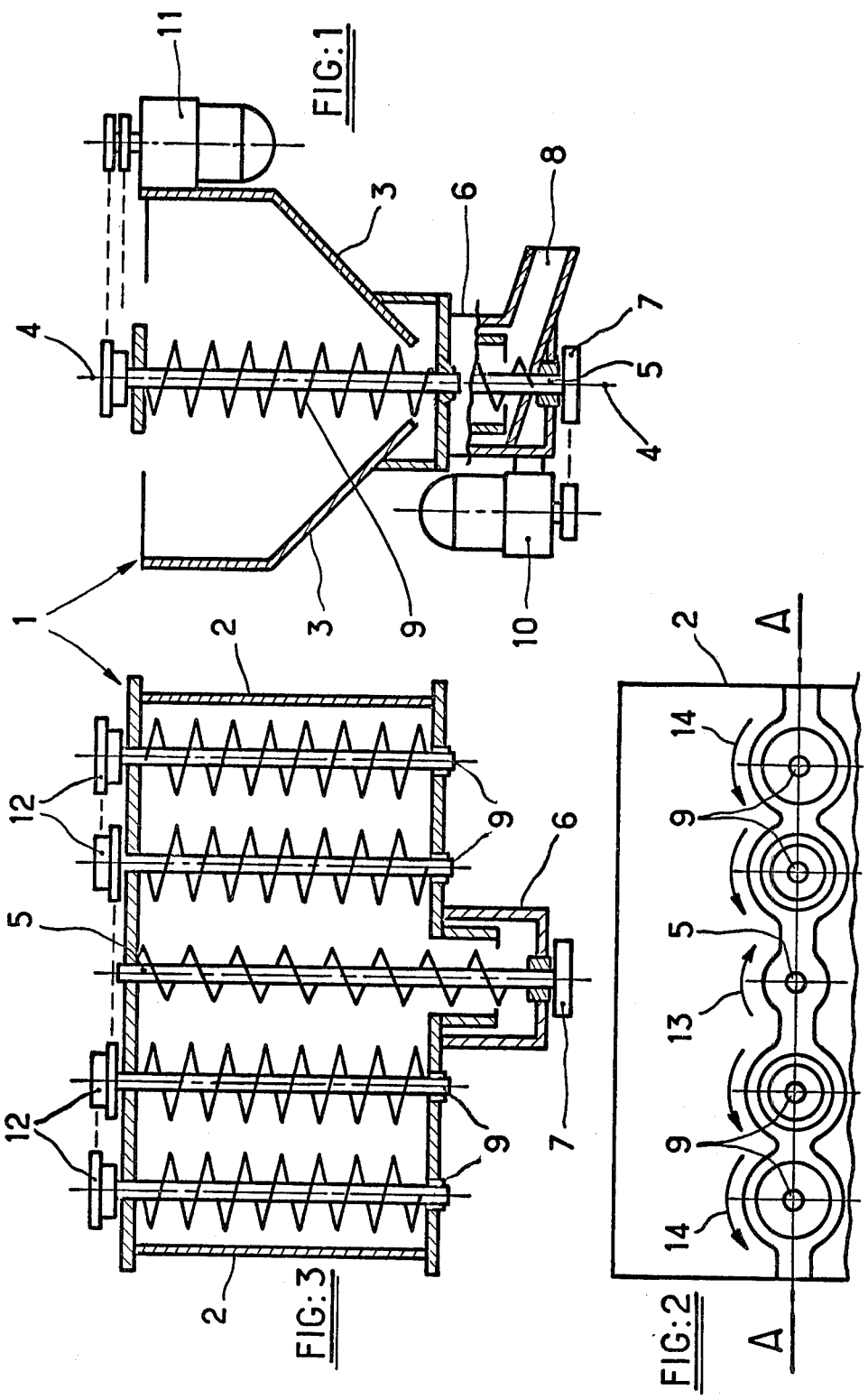

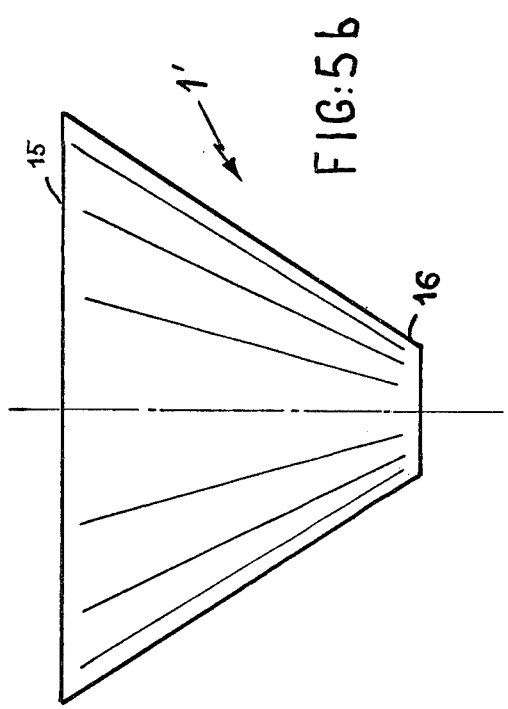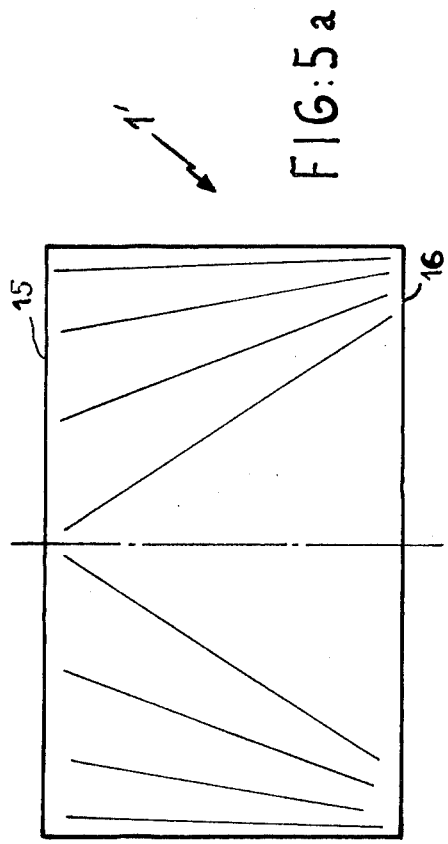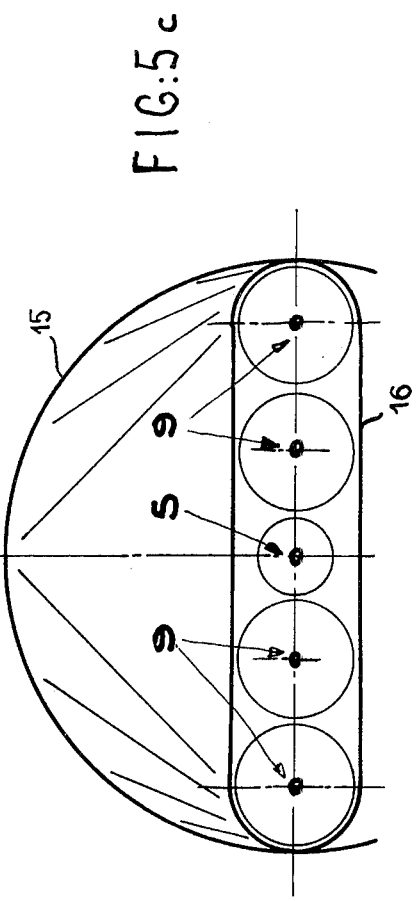

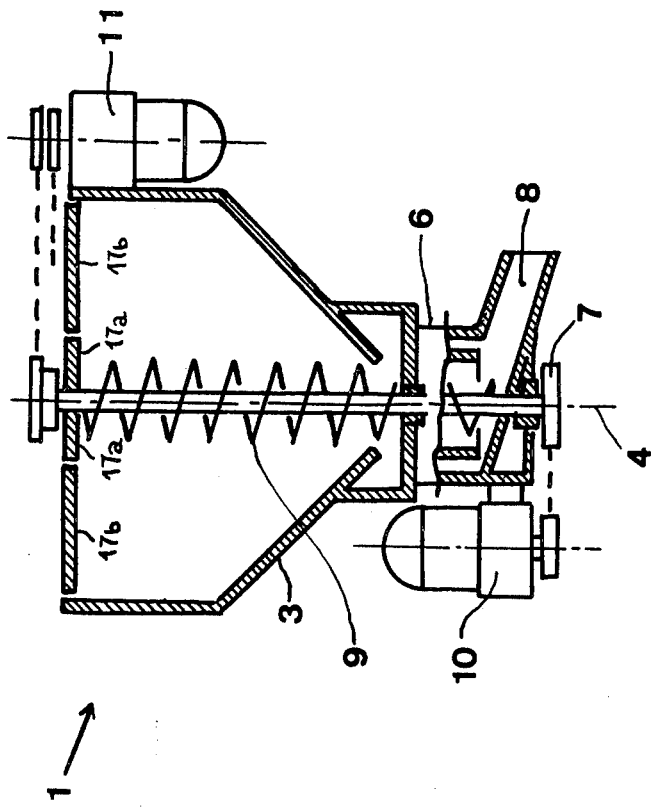

APPARATUS FOR DISPENSING MATERIAL IN BULK

BACKGROUND OF THE INVENTION

This invention relates to the field of extraction, mixing and dispensing of solid products stored in bulk in a hopper or similar container. In particular, the invention relates to an apparatus which enables solid materials stored in bulk and which have poor flow characteristics to be extracted, mixed and dispensed.

Many solid materials are kept or held temporarily in hoppers, storage tanks and similar containers before being subjected to subsequent operations such as extraction, mixing, and dispensing with a view in particular to physical and/or chemical treatment. However, certain bulk materials experience a great deal of difficulty in flowing freely and totally by gravity from the containers in which they are stored; this is the case, for example, of powdered materials of relatively low specific gravity, fibrous materials with various levels of moisture content, granulate and aggregate materials of various type forms, products made of materials having a high friction coefficient and materials which form lumps or clumps spontaneously, for example when subjected to atmospheric humidity. Of these products, the following may be cited for illustrative purposes: large and small wood chips or fiber which is to be used for papermaking and in the particle-board industry; unprocessed or defibered asbestos, particularly compacted asbestos; scrap from seals made of asbestos-rubber, similar or equivalent material; scraps and pieces of cardboard and paper confetti of various sizes; and defibered cellulose in sheet or flake form; granulated rubber; certain minerals or chemicals that are frequently moist. In this last category are: sand, potash, urea and the like; fine fragments arising from cutting plastic film scrap; expanded and granular materials; atomized silica; pieces of scrap materials such as leather, fiberglass, and the like; and fiber-dusting products and similar products and materials.

Extraction of the aforementioned materials and products having poor flow characteristics from their storage containers poses a series of problems difficult to resolve. Indeed, whatever the shape of the bin, hopper or container, gaps often occur along the axis or axes of the discharge opening or openings, and the product or material forms into bridges from the base or at any other level of its container. When the container is full or nearly full, the flow of material is initially normal through the discharge opening or openings situated at the base of the container which may be equipped with an Archimedes' screw conveyor or the like. Rather rapidly, however, a bridge of material forms or a void appears when the layers of material in the vicinity of the walls of the container stop sliding downwardly or a gap forms above the discharge opening or openings; these two phenomena can coexist. Thus, although the flow may be normal at the beginning, the flow becomes irregular and often ceases altogether, while the container still contains a large volume of bulk material to be discharged.

Various apparatus have been proposed in attempts to remedy the above-mentioned difficulties and shortcomings. For example, the bottom of the container can be provided with a material agitator having scrapers or blades of various shapes or with revolving cutters. These known apparatus are satisfactory for materials of relatively low specific gravity and materials for which the bridging phenomenon is not very marked. However, apparatus of this type are ineffective in the case of dense products whose form is such that a tangling phenomena can develop, giving rise to very solid bridges and/or vaults, or in the case of moist or dry products, which tend to form clumps or lumps. Accordingly to one known improvement, agitators can be provided whose blades are located at various levels in the tank, bin or other container. In this way efficiency is often improved, but the costs of construction and maintenance are high and such devices require substantial drive power when the stored product has a high or even average density. In other known apparatus the phenomenon of vibration is employed by installing one or more vibrators on the walls of the tank or container or by providing a vibrating cone at its base, in which case the product flows along the periphery situated between this cone and an opening in the container. These known apparatus have some effectiveness, particularly in the case of finely divided, granular powdered products, but they do not enable products or materials with a fibrous structure or materials that tend to lump or to clump to be effectively extracted from the container. In addition, the vibrations can, in many instances, increase the difficulty of extraction because the vibrations tend to cause the materials in the container to heap and to compact. It has also been proposed that one or more material-extracting screw conveyors be installed in the container, for example a series of Archimedes' screw conveyors arranged in parallel side-by-side over the entire bottom of the container. In this case the initial outflow is accelerated but there is no appreceaable effect on the bridging phenomeon itself, because the screw conveyors extract only the material located close to them and not the material a little further away.

SUMMARY OF THE INVENTION

It is the principal object of the present invention to provide an apparatus for dispensing material which enables the above-mentioned disadvantages and shortcomings to be remedied and the difficult problem of extraction to be resolved.

It is another object of the present invention to provide an apparatus for dispensing material which effects a regular rate of flow and with delivery of substantially all the materials stored in a container or the like, which material experiences poor gravity flow under the usual techniques employed to date.

It is an additional object of the present invention to provide an apparatus for dispensing material which is effective, is easily constructed and is economical to operate and enables the phenomena of bridging and appearance of gaps, hitherto inevitable, to be eliminated and substantially all the material stored to be transferred to a device which is to utilize or to process this material.

The invention offers the potential of making relatively homogeneous mixtures of solid bulk products and the materials extracted from the storage facility to be continuously dispensed.

The apparatus according to the present invention calls on a basic technique extraction, known of itself, based on the Archimedes' screw principal or equivalent system according to different embodiments for implementation, judiciously adapted to the problem at issue and giving rise to results not hitherto achieved.

The foregoing objects, as well as others which are to become clear from the text below, are achieved according to the present invention by providing a container with four walls, two opposite walls of which are sloped, the other two being essentially vertical, the container being provided in its interior with at least two rotating contrary-effect screw conveyors so as simultaneously to engender within the mass of solid bulk material an upward movement and a downward movement during the extraction operation from the container. It has been found that these opposite movements of the mass of bulk material to be extracted enables the formation of lumps to be inhibited and the material to be distributed uniformly (for example in the case of mixtures) but also enable any bridges that form to be broken up at any time and the appearance of gaps above the material discharge opening or openings to be avoided. In addition, this agitation in two opposite vertical directions favors regular continuous flow of the material and ensures that the material is dispensed directly at the outlet of the container.

According to one characteristic of the invention, the contrary effects of screw conveyors can be obtained either by using screw conveyors of opposite pitch and revolving them in the same direction, or by using screw conveyors of either identical or different pitches oriented in the same direction but revolving in opposite directions.

In practice, one or more of the screw conveyors, herein-after called extracting screw conveyors, are used to extract and to dispense the material from the container in a downwardly directed movement while the other or others, hereinafter called auxiliary screw conveyors, serve to generate the upwardly directed movement. It has been found particularly advantageous to provide at least one extraction screw conveyor and, on both sides of this screw conveyor, at least two auxiliary screw conveyors disposed at a minimum distance from the vertical walls of the container and from one or each extraction screw conveyor. For example, if a vertical extraction screw conveyor is installed approximately in the center of the container, which screw conveyor moves the product downward, one would add three or four or more auxiliary conveyors, depending on the volume and shape of the container with their axes of rotation substantially perpendicular to the vertical walls of the container, such that the vertical section of the assembly of screw conveyors, which are as close together as possible, occupies the maximum percentage of the median plane separating the two vertical walls.

Of course the exact distances between the walls of the container and the auxiliary screw conveyors, between the auxiliary screw conveyors and the extraction screw conveyor or conveyors, and the diameters and rpm's of the two types of screw conveyors are a function of various factors such as the type of material or materials to be extracted, the desired flow rate, and the capacity and shape of the container. The optimum parameters can easily be determined by the expert in the field as a function of each case in point. With respect to the rotational velocities, the two auxiliary screw conveyors adjacent to the extraction screw conveyor can be caused to rotate at a greater speed than the latter, the speed of any other auxiliary screw conveyors, providing upward movement, then being equal to, less than, or greater than that of the extraction screw conveyor; the speeds adopted may all be essentially identical, or substantial variations in angular velocity can be employed when all the screw conveyors are pitched in the same direction. The screw conveyors are driven in a manner known per se by a variable-speed or geared motor with either a chain or a belt drive or by any other equivalent means.

Any type of screw conveyor can be appropriate for implementation of the technique according to the present invention. It is convenient to use elements of the Archimedes' screw conveyor or a helix type screw conveyor composed of an endless blade of constant or variable width mounted on a central shaft acting as the axis of rotation. According to one alternative embodiment of the present invention, the auxiliary screw conveyor can be provided with teeth or cutters instead of simple blades or threads. Whether or not this is done, the scope of the invention is not limited to the types of blades or threads employed, provided that the container has at least two screw conveyors which, when rotating, cause both an upward and downward movement of material in the container. It has, however, been found that it was advantageous in many cases to provide the extracting screw conveyor or conveyors with a maximum diameter less than those of the auxiliary screw conveyor or conveyors. This enables the mass of bulk material to be better mixed and favors regularity of flow in the discharge opening or openings of the container.

According to another preferred characteristics of the present invention the sloping walls of the container must make an angle of between from substantially 20° to substantially 70° degrees, preferably from substantially 30° to substantially 60° degrees, with the horizontal. In addition, the set of walls is joined to the base of the container in such fashion that the bottom or base of the container, between the discharge opening or openings and the walls has a minimal plane surface. Indeed, the presence of any appreciable horizontal component on this bottom would constitute a support for the bulk material, which would accumulate and heap up in the vinicity of the lower part of the extracting screw conveyor with the risk of interrupting the extraction flow and requiring manual or mechanical rectificatin. Applicants were able to establish, after comparative tests in a container with a rectangular cross section, one of whose two sloping walls ended at the base in a plane surface, that an accumulation of material remained at the foot of this wall after extraction, whereas all the material had been extracted on the side bounded by the other wall, the lower end of which made an acute angle with the line of the axes of the extracting screw conveyor and auxiliary screw conveyors.

In practice, the container can be of various shapes and in general can have a rectangular or circular cross section. In the latter case, however, this section is circular only in the upper part; at the lower outlet it has a highly elongated elliptical section. As stated above, two walls are substantially vertical and the other two slope at an angle compatible with the product to be stored and extracted and within the above-mentioned range. If needed, and according to the desired capacities, these sloping walls can be surmounted by a vertical part whose function is to increase the available volume. In the case of use a closed tank or hopper as the container, the upper part can advantageously be composed of a truncated pyramid, the mirror image of the lower part, when the container is square or rectangular in cross section. If this cross section is circular, the upper part can, for example, be either flat or domed.

BRIEF DESCRIPTION OF THE DRAWING

The invention will be better understood from a detailed description of preferred embodiments provided for purposes of non-limitative illustration, and shown on the accompanying sheet of drawing in which:

FIG. 1 is a diagrammatic cross-sectional view of an apparatus for dispensing bulk materials according to the present invention;

FIG. 2 is a top, somewhat schematic view of the apparatus of FIG. 1; and

FIG. 3 is a cross-sectional view in the longitudinal direction of the apparatus of FIG. 1, the section being taken along line A—A visible in FIG. 2.

FIGS. 5a–5c are respectively a side, front and top views of a hopper suitable for use in the apparatus of FIGS. 3 and 4, the screw conveyors being visible in FIG. 5c.

FIG. 6 is a plan view of the apparatus of FIGS. 1–3 showing a cross-sectional view of the apparatus, illustrating the apparatus with a cover over the hopper.

DETAILED DESCRIPTION OF THE PREFERRED EMBODIMENTS

Figure 4:
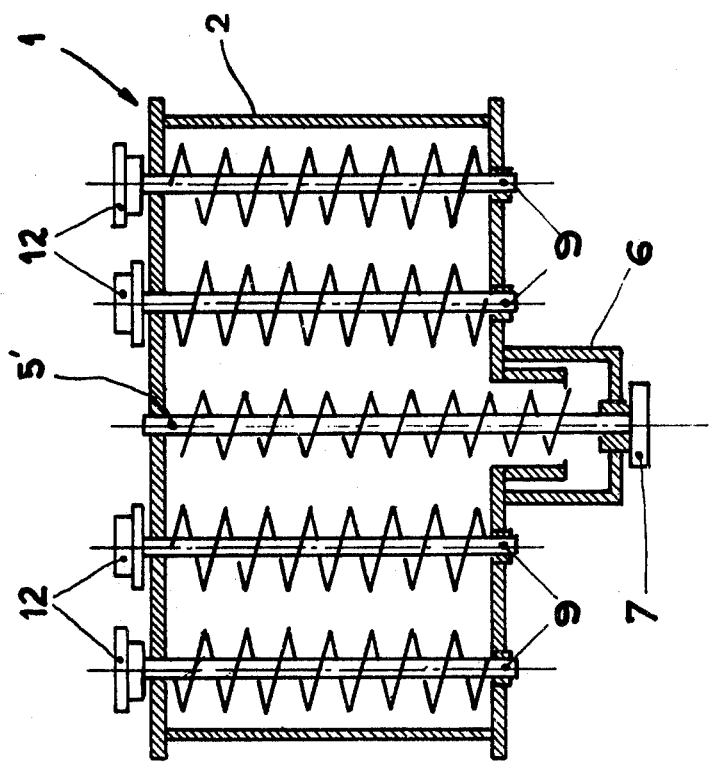
FIG. 4 is a cross-sectional view in the longitudinal direction of an embodiment of the type shown in FIG. 3 in which the extraction screw conveyor has the same pitch and orientation as the auxiliary screw conveyors.

Referring to FIGS. 1–3, an apparatus for dispensing solid, bulk materials includes a container in the form of a hopper 1 which has a general pyramidal shape surmounted by a rectangular part. The hopper 1 is provided with two vertical walls 2 and two sloping walls 3 which form, at their lower ends, an acute angle with the median axis 4 of the hopper 1. In this illustrated embodiment, the hopper 1 has at its center an extracting screw conveyor 5 which terminates at its lower end in a tube 6 provided on the one hand with a lower bearing 7 of the extracting screw conveyor 5 and provided on the other hand with a sloping branch which is an outlet chute 8 of the apparatus.

On either side of center, extracting screw conveyor 5 are a number of other screw conveyors 9, hereinater called auxiliary screw conveyors, with overall diameters greater than that of the extracting screw conveyor 5. In this embodiment the hopper 1 has four auxiliary screw conveyors 9 aligned with the extracting screw conveyor 5 along a line perpendicular to the vertical walls 2 of hopper 1. As may be seen from FIG. 2, the blades of the auxiliary screw conveyors 9 are close to each other and at short distance from the vertical walls 2.

The extracting screw conveyor 5 is driven rotationally by any known means, for example with the aid of a geared motor 10 or a variable-speed, direct-current motor. The reverse rotation of the auxiliary screw conveyors 9 is also provided by any known means, for example with the aid of a geared motor 11 via either a chain or a belt drive acting on bearings 12 of these screw conveyors. Of course, one may install several geared motors 11 or several gears driven by the same motor so as to cause the respective speeds of auxiliary screw conveyors 9 to vary, for example, in pairs.

According to one mode of operation of the apparatus described hereinabove, wherein the extracting screw conveyor or conveyors 5 and the auxiliary screw conveyors 9 are composed of helixes pitched in the same direction, the center extracting screw conveyor 5 can be rotated clockwise (arrow 13 in FIG. 2) and the four auxiliary screw conveyors 9 can be rotated counter-clockwise (arrow 14 in FIG. 2) at the same speed or at different speeds. Hence, the center screw conveyor 5 exerts a downward movement on the material in the hopper 1 and drives the material toward the outlet chute 8 while the auxiliary screw conveyors effect an upward movement of the material in the hopper 1. When the hopper 1 is charged with bulk material to be extracted and dispensed, the lower part of the charge is constantly being brought to the surface, which lightens the effective specific gravity of the material and causes it to be aerated. The particles of material lifted in this manner fall and feed the downwardly acting extracting screw conveyor 5, thus enabling lumping and agglomerating to be avoided.

In addition, small clumps or mounds of the material temporarily formed at the base of the hopper 1 are mixed in by the blades of the auxiliary screw conveyor 9, which send the bulk material upward by sweeping the bottoms of the walls. In addition, due to the constantly moving barrier created by the auxiliary screw cnveyors 9, between the walls 3 which slope in opposite directions, one avoids the well-known heaping phenomena in storage and extraction hoppers. In facts, rotation of the screw conveyors 5 and 9 prevents the opposition of force vectors generated by the walls, which are responsible for the heaping.

According to another advantage achieved by the apparatus according to the present invention, it becomes possible for most bulk products, when the respective velocities of the various screw conveyors 5 and 9 are properly adjusted, continuously to dispense the bulk material extracted. Of course, it is possible to attach to the apparatus, if desired, any other auxiliary dispenser such as weighing-batching belt, vibrating dispenser. vibrating endless screw or the like. The lower powers involved make it very easy to have the speed of the extracting screw 5 to be controlled by the specific attached dispensing means selected.

Finally, the apparatus of the present invention can, in many cases, act as a mixer of various bulk products, which enhances its use possibilities still further. It has also been found, after many tests, that such an apparatus is very effective in decompressing and aerating compressed materials such as for example balls and packets of defibrated asbestos, or similar materials.

FIG. 4 illustrates an apparatus for dispensing solid, bulk materials, in cross-section, of the type illustrated in FIGS. 1–3, the hopper 1, walls 2, tube 6, lower bearing 7, axuiliary screw conveyors 9 and bearings 12 corresponding to those members having the same reference numerals in FIG. 3. The main screw conveyor 5' differs from screw conveyor 5 (FIG. 3) by having a pitch of the same magnitude and orientation as the pitches of the auxiliary screw conveyors 9.

FIGS. 5a–5c are respectively a side, front and top view of the hopper 1' which can be used in the apparatus of FIGS. 1–3 and FIG. 4 for in place of the hopper 1 shown therein. Hopper 1', as can be seen in FIGS. 5a–5c has a circular, open top portion 15 and an elongated ellipse portion 16.

As shown in FIG. 6, which illustrates a variant of the apparatus of FIGS. 1–3 or FIG. 4, the top of the hopper 1 is provided with a cover formed of two parts 17a, 17b shown in cross-section.

Of course, the invention is not limited to the embodiments and description hereinabove and extends to any equivalent implementation or alternative within the scope of the appended claims.

What is claimed is:

1. An apparatus for dispensing solid, bulk material having limited flow characteristics under the influence of gravity, the apparatus comprising a container having at least one bottom opening and four walls, two of said walls being positioned one another and being oppositely sloped and the other two of said walls being positioned opposite one another and being substantially vertical; at least one main rotary extracting screw conveyor means having an axis of rotation and extending upwardly within said container for moving material downwardly to said bottom opening, said axis of rotation of said means conveyor means being in a plane substantially parallel to said substantially vertical walls; and at least one auxiliary rotary screw conveyor means having an axis of rotation and extending upwardly within said container for moving material upwardly within said container simultaneously with the downward movement effected by said main conveyor means, said axis of rotation of said auxiliary conveyor means being in a plane substantially parallel to said substantially vertical walls, whereby material in the container simultaneously undergoes upward and downward movements during extraction, flow from the opening maintained and the formation of bridges above the opening avoided.

2. An apparatus according to claim 1, wherein said extracting main screw conveyor means and said auxiliary screw conveyor means are provided with reverse screw pitches, and including means for simultaneously driving all of said screw conveyor means to effect rotational movement in a given direction.

3. An apparatus according to claim 1, wherein said extracting main screw conveyor means and said auxiliary screw conveyor means are provided with pitches orientated in a given direction, and including means for driving said main conveyor means in a given direction of rotation and for driving said auxiliary conveyor means in a direction of rotation opposite to said given direction of rotation.

4. An apparatus according to claim 3, wherein the pitches are of substantially the same magnitude.

5. An apparatus according to claim 3, wherein the pitches are of different magnitudes.

6. An apparatus according to claim 1, wherein a plurality of said auxiliary screw conveyor means are provided and including means driving all of said auxiliary screw conveyor means in a given direction of rotation.

7. An apparatus according to claim 1, wherein each said extracting screw conveyor means has an outside diameter less than that of said auxiliary screw conveyor means, the latter being disposed a very short distance from said vertical walls of said container and from each of said extracting screw conveyor means, and said container having its bottom opening connected to a pipe serving as an outlet chute for the material, said chute having a minimal horizontal surface.

8. An apparatus according to claim 1, wherein said container comprises a hopper having an upper portion with a circular section and a lower portion shaped as an elongated ellipse.

9. An apparatus according to claim 1, wherein said container comprises a hopper having an upper portion of rectangular section.

10. An apparatus according to claim 1, wherein said container comprises a hopper having an upper open portion.

11. An apparatus according to claim 1, wherein said container comprises a hopper having an upper closed portion.

* * * * *